(12) United States Patent
Fu

(10) Patent No.: US 7,749,470 B2
(45) Date of Patent: Jul. 6, 2010

(54) METHOD FOR PROCESSING WASTE COPPER LIQUID TO PRODUCE HIGH COPPER CONTENT SLUDGE

(75) Inventor: Cheng-Hao Fu, Taipei County (TW)

(73) Assignee: Unitech Printed Circuit Board Corp., Tu-Cheng, Taipei (TW)

( * ) Notice: Subject to any disclaimer, the term of this patent is extended or adjusted under 35 U.S.C. 154(b) by 486 days.

(21) Appl. No.: 11/797,935

(22) Filed: May 9, 2007

(65) Prior Publication Data

US 2008/0279737 A1 Nov. 13, 2008

(51) Int. Cl.
*C02F 1/00* (2006.01)
(52) U.S. Cl. .............................. 423/42; 423/43; 210/723
(58) Field of Classification Search ................... 423/42, 423/43; 210/723–728
See application file for complete search history.

(56) References Cited

U.S. PATENT DOCUMENTS 4,343,706 A * 8/1982 Etzel et al. ................... 210/667

2006/0278583 A1 * 12/2006 Hsiao et al. ................... 210/710

* cited by examiner

*Primary Examiner*—Steven Bos
(74) *Attorney, Agent, or Firm*—Muncy, Geissler, Olds & Lowe, PLLC

(57) ABSTRACT

A method for processing waste copper liquid produces high copper content sludge, mainly by recycling a low copper content waste liquid from production of PCB in order to discharge a comparatively higher copper content sludge. First, the waste liquid is classified into an acidic low concentration copper waste liquid, an acidic high concentration copper waste liquid, and an oxidized acidic high concentration copper waste liquid. Then mix with a strong alkali to react and form a cupric oxide sludge that then undergoes dehydration and baking by applicable equipment to remove water and get a higher copper content sludge. It is therefore unnecessary to add other conversion agents to convert copper hydroxide into cupric oxide, thereby turning the valueless low copper content sludge from a waste liquid into a valuable recyclable high copper content sludge.

13 Claims, 5 Drawing Sheets

METHOD FOR PROCESSING WASTE COPPER LIQUID TO PRODUCE HIGH COPPER CONTENT SLUDGE

BACKGROUND OF THE INVENTION

1. Field of the Invention

The present invention relates to a method for processing waste copper liquid to produce high copper content sludge, and more particularly to the process of classifying the waste liquid from PCB production into an acidic low copper content waste liquid, an acidic high concentration copper content waste liquid and an oxidized acidic high concentration copper waste liquid, and mixing the waste liquid with a strong alkali to raise the content of copper in the sludge, thereby improving the economical values of the recycle.

2. Description of the Prior Art

Following the development and popularization of electronic information products, the PCB output value already exceeded NT$100 billion, and aside from a plurality of organic pollutants in the waste water, waste liquid and other disposables resulting from the use of chemicals and special raw materials for PCB production process, substantial quantities of copper, lead and nickel in copper compounds are also included. If such voluminous heavy metals are not properly treated, serious environmental pollution could be caused and even pose a serious threat to human health.

Presently, the PCB manufacturers would first neutralize the pH value of the discharged low copper content waste liquid and then remove water until it reaches the regulated standard for discharge; afterwards, the copper sludge would be outsourced to specialized companies for extraction and recycling of copper. Since treatment fees charged by the outsourced companies are based on the weight of the copper sludge, such charges could be a heavy burden on the PCB manufacturers if the copper content of the sludge is not raised. Following continuous accumulation of disposables, it is critical to resolve the generation of disposables, raise its value for recycling and minimize the impact to the environment by reducing the disposables or completely recycle and reuse the disposables, thereby minimize the threat by disposables to the quality of our living environment.

PCB manufacturers use huge quantities of copper for the production of PCB; during the production process, etching, surface treatment and other processes generate acidic low concentration copper waste liquid and acidic high concentration copper waste liquid and oxidized acidic high concentration copper waste liquid, therefore, it is necessary to improve the treatment method of conventional waste liquid in order to raise the copper content of the sludge to make it valuable for recycle. Presently, however, no recycling flow is available for both treating the low copper content waste liquid and also effectively converting the copper waste liquid and derivative copper sludge into cupric oxide (CuO) with high recycle value. To raise the value of disposables for recycling and to resolve the problem of output of sludge onsite in the factory can avoid the entailed cost and risk in outsourcing.

Referring to FIG. 1, the conventional method of PCB manufacturers for treating copper waste liquid is mainly by direct mixing of acidic low concentration copper waste liquid (for example, washing waste water with copper content) and acidic high concentration copper waste liquid (such as copper sulfate waste liquid, copper nitrate waste liquid, sodium persulfate light etching waste liquid (SPS waste liquid), sulfuric acid chlorine dioxide light etching waste liquid (G5B waste liquid) and cupric chloride waste liquid, etc), then add sodium hydroxide (NaOH) to adjust the pH value to 8.5~9.5; afterwards, add coagulating agent (such as ferric chloride (FeCl3) or use backflow of copper sludge as substitute); further, add polymer for cementing and form copper hydroxide ($Cu(OH)_2$) (with copper content 1-2% and water content 98%), and use a dryer to remove water to reduce the water content to 70% (with copper content only 3%~10%), and again use an oven to further lower the water content to 40% and obtain copper hydroxide ($Cu(OH)_2$) with copper content between 7%-15%.

However, this treatment method is mainly used to discharge the copper ions in the waste liquid so it forms solid copper hydroxide sludge ($Cu(OH)_2$) and the copper content is only 5~15% with no recycle value and yet has to pay very stiff treatment costs.

SUMMARY OF THE INVENTION

In view of the shortcomings of the conventional method, the inventor of the present invention has strived to make improvements to overcome its shortcomings and sought for an integrated and reasonable solution; after conducting extensive researches and experiments, the inventor finally developed a treatment method for producing high copper content sludge from low copper content waste liquid in accordance with the present invention.

Therefore, it is a primary objective of the present invention to provide a better method to raise the copper content of sludge for recycling the low copper content waste liquid generated from production of PCB and reduce disposables treatment cost for enterprises.

Another objective of the present invention is to provide a treatment method for generating high copper content sludge from low copper content waste liquid; this is mainly by mixing the acidic low concentration copper waste liquid with the strong alkali to a pH value approximately 8.5~9.5, then add coagulating agent (ferric chloride ($FeCl_3$) or use backflow of copper sludge as substitute) and polymer to turn it into copper hydroxide sludge ($Cu(OH)_2$); further, add oxidized acidic high concentration copper waste liquid and acidic high concentration copper waste liquid to the copper hydroxide till the pH value falls in between 0.5~2.0 and further add strong alkali (such as sodium hydroxide) to adjust pH value to over 10 to cause chemical reaction to become cupric oxide sludge.

Another objective of the invention is to provide a treatment method for generating high copper content sludge from low copper content waste liquid, mainly by adding oxidized acidic high concentration copper waste liquid and acidic high concentration copper waste liquid to the copper hydroxide till the pH value falls in between 0.5~2.0 and further add strong alkali (such as sodium hydroxide) to adjust the pH value to over 10 to cause chemical reaction to become cupric oxide sludge.

Another objective of the present invention is to provide a treatment method for generating high copper content sludge from low copper content waste liquid, mainly by adding strong alkali (such as sodium hydroxide) to the oxidized acidic high concentration copper waste liquid and adjust its pH value to above 10 to cause chemical reaction to become cupric oxide sludge.

Another objective of the invention is to provide a treatment method for generating high copper content sludge from low copper content waste liquid, mainly by mixing the oxidized acidic high concentration copper waste liquid with acidic high concentration copper waste liquid to adjust its pH value to between 0.5~2.0, and further add strong alkali (such as sodium hydroxide) to adjust its pH value to over 10 to cause chemical reaction to form cupric oxide sludge.

Said cupric oxide sludge generated by chemical reaction would undergo dehydration by a dryer to reduce water content to solid (often referred to as the sludge cake) and then further baked dry with an oven to obtain high copper content cupric oxide sludge; henceforth, it is unnecessary to add additives in order to turn the copper hydroxide sludge into valuable cupric oxide sludge; after further dehydration and baking, the copper content is far higher than copper sludge produced by conventional treatment methods.

To make it easier for our examiner to understand the present invention, the following embodiment accompanied with the related drawings are described in details.

DETAILED DESCRIPTION OF THE PREFERRED EMBODIMENTS

Figure 1:
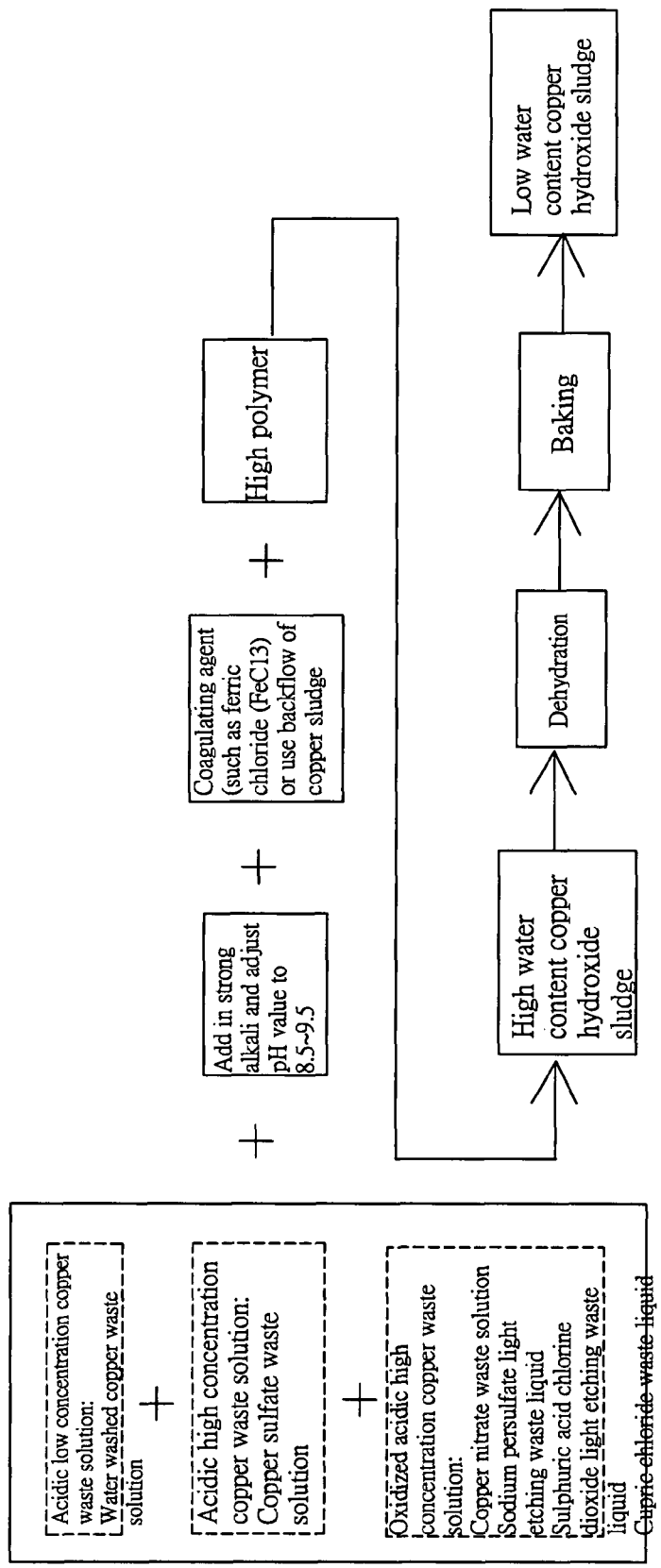
FIG. 1 is a schematic view of a conventional processing method of low copper content waste liquid.
Figure 2:
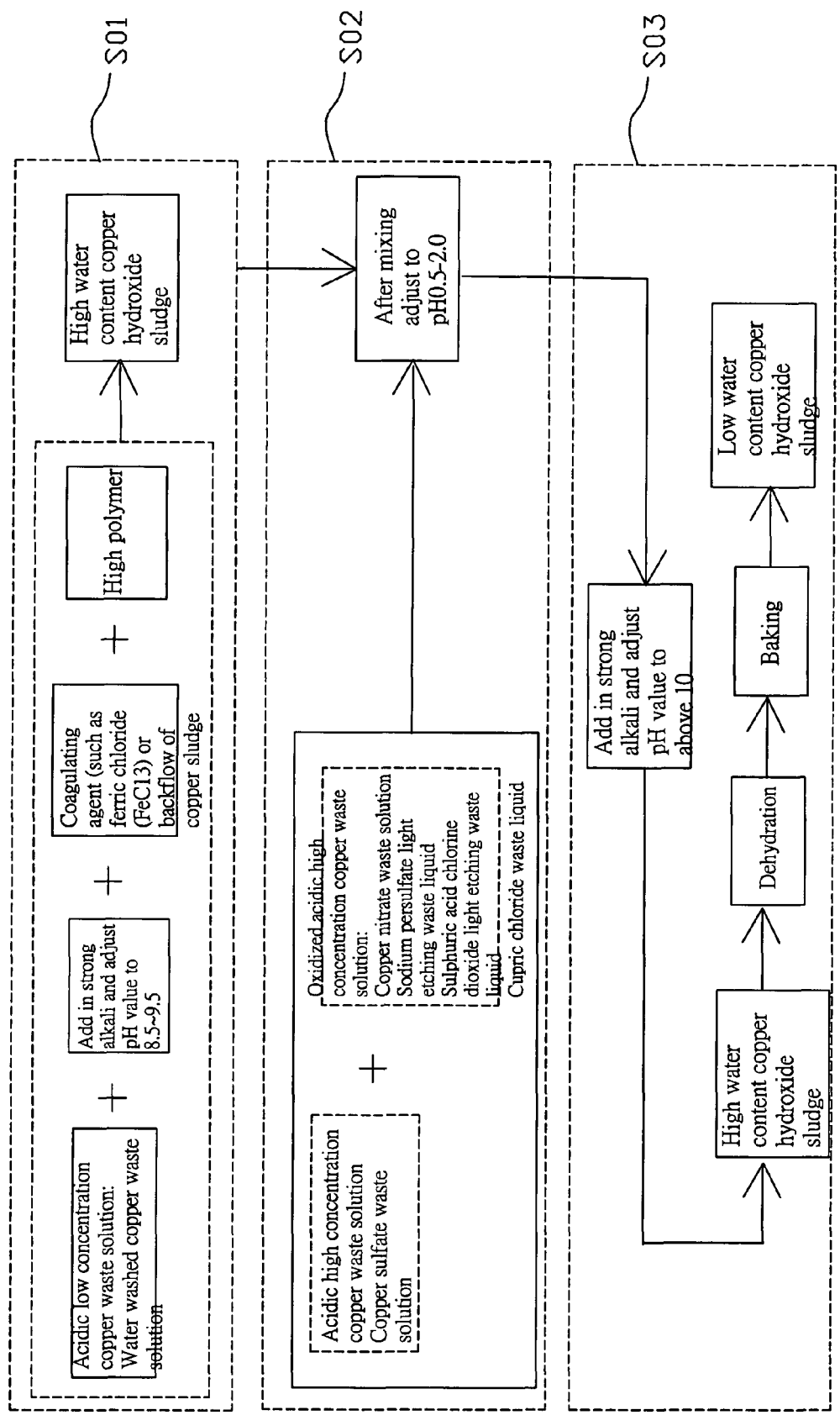
FIG. 2 is a schematic view of the process flow of the first preferred embodiment in accordance with the present invention.
Figure 3:
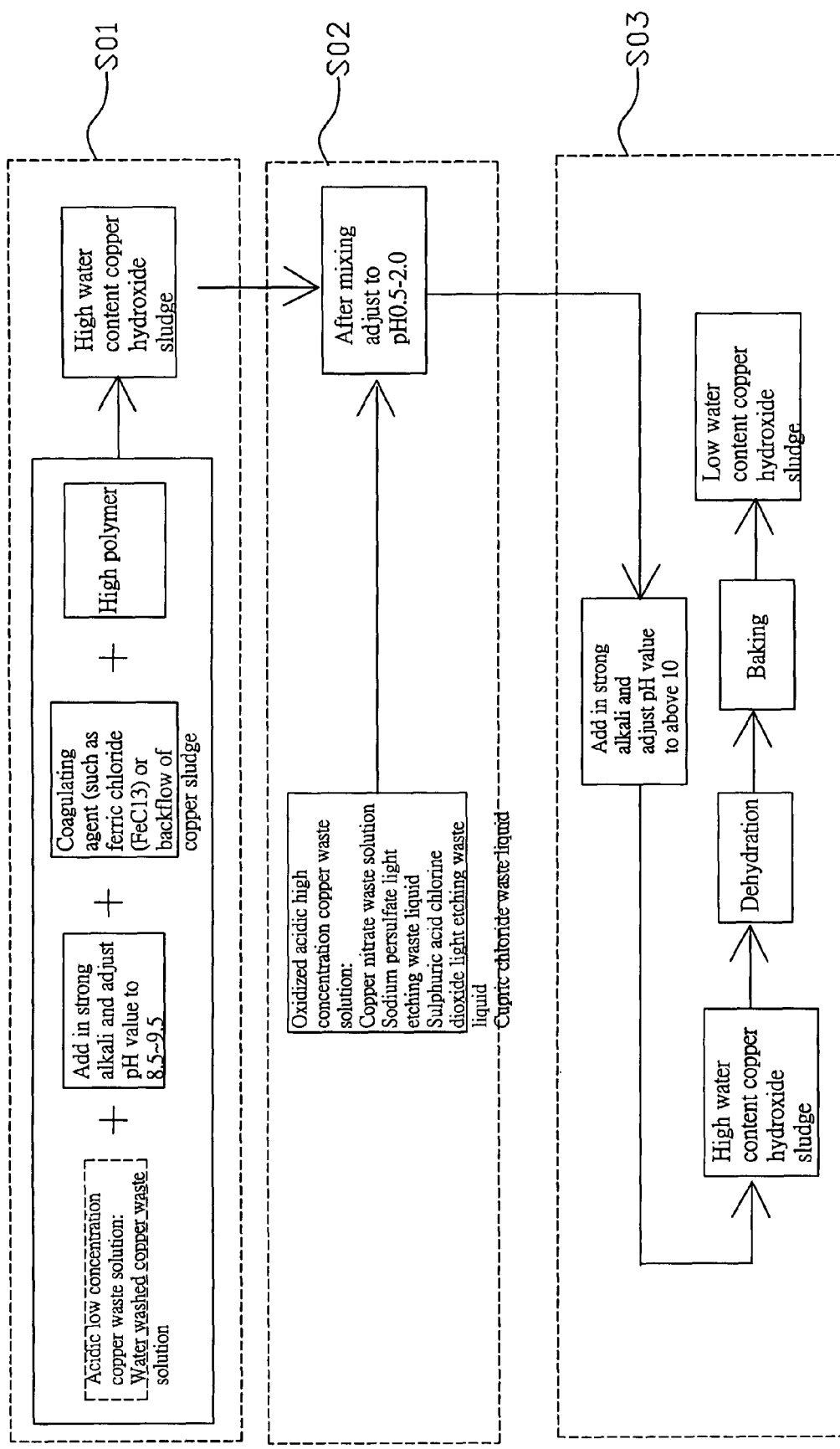
FIG. 3 is a schematic view of the process flow of the second preferred embodiment of the present invention.
Figure 4:
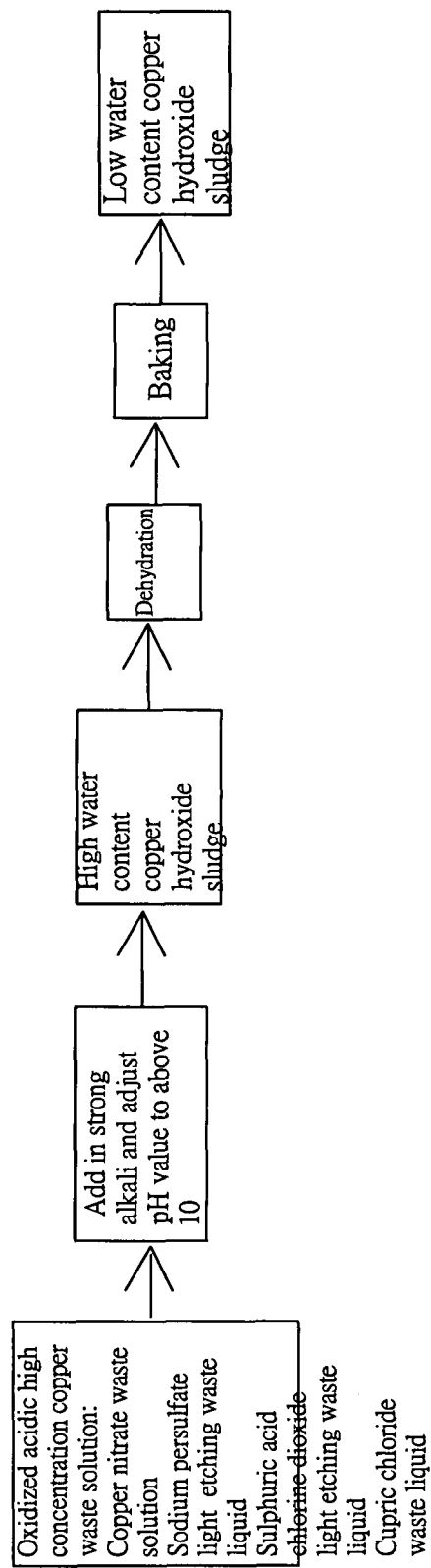
FIG. 4 is a schematic view of the process flow of the third preferred embodiment in accordance with the present invention.
Figure 5:
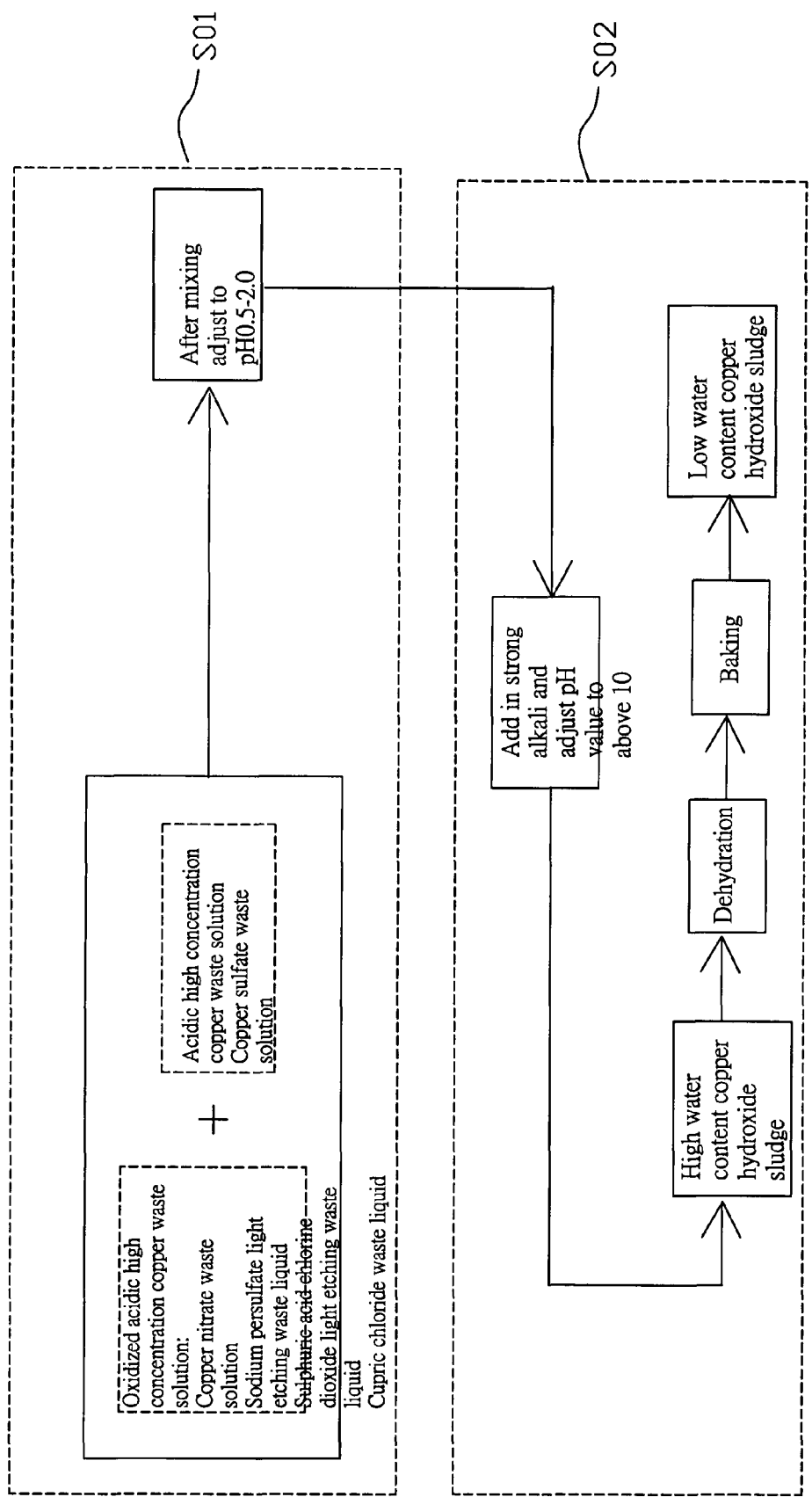
FIG. 5 is a schematic view of the process flow of the fourth preferred embodiment in accordance with the present invention.

First, copper content of the acidic low concentration copper waste liquid as defined in the present invention should be below 1% while the copper content of the acidic high concentration copper waste liquid should be equal to or above 1%. Referring to FIG. 2, the implementation of generation of high copper content sludge from low copper content waste liquid in accordance with the present invention comprises following steps:

Step S01: After mixing the acidic low concentration copper waste liquid (such as the low copper content washing waste water) with strong alkali (sodium hydroxide as in this preferred embodiment), adjust its pH value to between 8.5~9.5 and add coagulating agent (such as ferric chloride ($FeCl_3$) or copper sludge backflow) and polymer to enable it to precipitate and generate copper hydroxide ($Cu(OH)_2$);

Step S02: following step 1, mix the copper hydroxide sludge with the acidic high concentration copper waste liquid and the oxidized acidic high concentration copper waste liquid, and adjust its pH value to between 0.5~2.0;

Step S03: following step 2, add strong alkali (such as sodium hydroxide) to the acidic copper waste liquid with pH value between 0.5~2.0 to adjust its pH value to above 10 to cause chemical reaction to form cupric oxide (CuO) sludge;

Referring to FIG. 3, steps S01~S03 are for second implementation method of the present invention, mainly by step 1 of the first implementation method to generate copper hydroxide sludge (as shown in step S01); then mix with the oxidized acidic high concentration copper waste liquid to adjust its pH value to between 0.5~2.0 (as shown in step S02); afterwards, mix with strong alkali (such as sodium hydroxide) to adjust its pH value to over 10 so as to form cupric oxide (CuO) sludge (as shown in S03);

Referring to FIG. 4, this is the third implementation method of the present invention by mixing the oxidized acidic high concentration copper waste liquid with strong alkali (such as sodium hydroxide) to adjust its pH value to above 10 to cause reaction to form cupric oxide (CuO) sludge;

Referring to FIG. 5, this is the fourth implementation method of the present invention by mixing the oxidized acidic high concentration copper waste liquid with the acidic high concentration copper waste liquid to adjust its pH value to between 0.5~2.0 (as shown in step S01), and then add in strong alkali (such as sodium hydroxide) to adjust its pH value to above 10 to carry out reaction to form cupric oxide (CuO) sludge (as shown in step S02);

Cupric oxide (CuO) generated from above reaction would undergo dehydration by a dryer to make its water content to lower to 50%, and afterwards use an oven to bake dry and get high copper content cupric oxide (CuO) sludge.

Accordingly, it is unnecessary to add additives to turn the copper hydroxide sludge into valuable cupric oxide sludge and its copper content after baking is far higher than that obtained using conventional technology.

The acidic high concentration copper waste liquid referred to in the present invention includes the copper sulfate waste liquid.

And the oxidized acidic high concentration copper waste liquid includes copper nitrate waste liquid, sodium persulfate light etching waste liquid, sulfuric chlorine dioxide light etching waste liquid and the cupric chloride waste liquid.

The coagulating agent adopted in the present invention refers to ferric chloride ($FeCl_3$) or copper sludge backflow, and strong alkali refers to the hydroxide compounds such as sodium hydroxide.

In summation of the description above, the present invention provides a simple and easy way to implement treatment of the low copper content waste liquid to produce high copper content sludge, and the method can be modified according to the needs of the user to enhance its performance, and its treatment of recycling the PCB is unprecedented, and fully complies with the patent application requirements and is duly filed for the patent application.

What is claimed is:

1. A method for processing waste copper liquid to produce high copper content sludge, comprising the steps of:
    mixing an acidic low concentration copper waste liquid with a strong alkali to adjust said acidic low concentration copper waste liquid to a pH value of between 8.5~9.5, then add coagulating agent and a polymer to said acidic low concentration copper waste liquid to cause a reaction to form a copper hydroxide (Cu(OH)2) sludge; and
    then mixing the copper hydroxide sludge with an oxidized acidic high concentration copper waste liquid to adjust said oxidized acidic high concentration copper waste liquid to a pH value of between 0.5~2.0; and
    after mixing to a pH value between 0.5~2.0 upon the completion of the above steps, add in the strong alkali to said oxidized acidic high concentration copper waste liquid to adjust a pH value of said oxidized acidic high concentration copper waste liquid to above 10 for carrying out a reaction and forming a cupric oxide (CuO) sludge; and
    the cupric oxide sludge generated by a chemical reaction from the above steps undergoes dehydration and baking to lower water content of said cupric oxide sludge to get a higher copper content cupric oxide (CuO) sludge.

2. The method for processing waste copper liquid to produce high copper content sludge as recited in claim 1, wherein said oxidized acidic high concentration copper waste liquid is mixed with an acidic high concentration copper waste liquid in advance.

3. The method for processing waste copper liquid to produce high copper content sludge as recited in claim 1, wherein said acidic low concentration copper waste liquid is a low copper content washing waste water.

4. The method for processing waste copper liquid to produce high copper content sludge as recited in claim 2, wherein said acidic high concentration copper waste liquid is a copper sulfate waste liquid.

5. The method for processing waste copper liquid to produce high copper content sludge as recited in claim 1, wherein said oxidized acidic high concentration copper waste liquid is either a copper nitrate waste liquid, a sodium persulfate light etching waste liquid, a sulfuric chlorine dioxide light etching waste liquid or either one or a plurality of cupric chloride waste liquids.

6. The method for processing waste copper liquid to produce high copper content sludge as recited in claim 1, wherein the coagulating agent is ferric chloride ($FeCl_3$).

7. The method for processing waste copper liquid to produce high copper content sludge as recited in claim 1, wherein the coagulating agent is a copper sludge backflow.

8. The method for processing waste copper liquid to produce high copper content sludge as recited in claim 1, wherein the strong alkali is sodium hydroxide.

9. The method for processing waste copper liquid to produce high copper content sludge, comprising the steps of:

adding a strong alkali into an oxidized acidic high concentration copper waste liquid to adjust said oxidized acidic high concentration copper waste liquid to a pH value to above 10 for a reaction to form a cupric oxide (CuO) sludge;

performing dehydration and baking to lower the water content of the cupric oxide generated by the reaction of above steps, so as to get a higher copper content cupric oxide (CuO) sludge.

10. The method for processing waste copper liquid to produce high copper content sludge as recited in claim 9, wherein said oxidized acidic high concentration copper waste liquid is either a copper nitrate waste liquid, a sodium persulfate light etching waste liquid, a sulfuric chlorine dioxide light etching waste liquid or either one or a plurality of cupric chloride waste liquids.

11. The method for processing waste copper liquid to produce high copper content sludge as recited in claim 9, wherein said oxidized acidic high concentration copper waste liquid is pre-mixed with an acidic high concentration copper waste liquid to adjust the pH value of the mixed copper waste liquid to between 0.5~2.0 and again mix said mixed copper waste liquid with a strong alkali.

12. The method for processing waste copper liquid to produce high copper content sludge as recited in claim 11, wherein said acidic high concentration copper waste solution is a cupric sulfate waste liquid.

13. The method for processing waste copper liquid to produce high copper content sludge as recited in claim 9, wherein said strong alkali is sodium hydroxide.

* * * * *